United States Patent [19]

Bockno

[11] E Re. 31,457

[45] Reissued * Dec. 6, 1983

[54] VISCOSE RAYON

[75] Inventor: Gregory C. Bockno, Media, Pa.

[73] Assignee: Avtex Fibers Inc., Valley Forge, Pa.

[ * ] Notice: The portion of the term of this patent subsequent to Oct. 17, 1995 has been disclaimed.

[21] Appl. No.: 390,476

[22] Filed: Jun. 21, 1982

Related U.S. Patent Documents

Reissue of:

[64] Patent No.: 4,245,000
Issued: Jan. 13, 1981
Appl. No.: 21,150
Filed: Mar. 16, 1979

U.S. Applications:

[63] Continuation-in-part of Ser. No. 793,572, May 4, 1977, abandoned.

[51] Int. Cl.[3] ..... D03D 3/00

[52] U.S. Cl. ..... 428/224; 264/168; 264/188

[58] Field of Search ..... 264/168, 188; 428/224

[56] References Cited

U.S. PATENT DOCUMENTS

| | | | |
|---|---|---|---|
| 3,713,964 | 1/1973 | Sasakuva | 264/188 |
| 3,729,371 | 4/1973 | Sasakuva | 264/188 |
| 3,741,862 | 6/1973 | Kubota et al. | 264/188 |
| 4,121,012 | 10/1978 | Bockno | 264/188 |
| 4,144,079 | 3/1979 | Smith | 264/191 |

FOREIGN PATENT DOCUMENTS

| | | | |
|---|---|---|---|
| 41-17699 | 10/1966 | Japan | 264/188 |
| 43-14182 | 6/1968 | Japan | 264/188 |
| 43-28777 | 12/1968 | Japan | 264/188 |
| 46-6101 | 2/1971 | Japan | 264/188 |
| 46-6102 | 2/1971 | Japan | 264/188 |
| 46-7210 | 2/1971 | Japan | 264/188 |
| 48-4564 | 2/1973 | Japan | 264/188 |
| 50-25051 | 8/1975 | Japan | 264/188 |

*Primary Examiner*—Jay H. Woo
*Attorney, Agent, or Firm*—Arthur R. Eglington

[57] ABSTRACT

A crimped, high wet modulus viscose rayon fiber having a multilobular, skin core cross-section wherein the core is surrounded by a discontinuous broken skin that imparts to fabrics an improved cover and hand properties. The fibers are formed from a modifier-free viscose. The elimination of the modifier reduces manufacturing costs and eliminates an environmental pollution problem created in the discharge of spinning baths containing modifiers.

22 Claims, 3 Drawing Figures

VISCOSE RAYON

Figure 1:
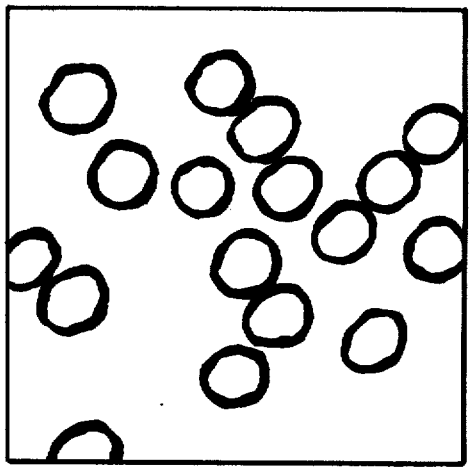

Matter enclosed in heavy brackets [ ] appears in the original patent but forms no part of this reissue specification; matter printed in italics indicates the additions made by reissue.

CROSS REFERENCE

This application is a continuation-in-part of my allowed pending U.S. patent application Ser. No. 793,572, filed May 4, 1977.

This invention relates to the production of regenerated cellulose or viscose rayon fibers and filaments. More specifically the invention is directed to the production of crimped, high-wet modulus type viscose rayon fibers and filaments.

Because of their strength, luster, softness and hand, viscose rayon fibers and filaments have had a wide acceptance. Low-wet modulus vicose rayon fibers typically referred to commercially as regular rayon, are characterized in fabric form by excessive shrinkage when wet and then dried, and by a relatively low modulus in the wet state. Such fibers have a wet modulus of about 2.5 to 3.0 gm./denier. On the other hand, the use of high wet modulus fibers in fabric has demonstrated their utility in terms of improved fabric yield and in overall fabric performance as it relates to consumer use.

Such fibers have a wet modulus of 5 to 15 gm./denier and this range encompasses typical wet modulus values for most cottons.

In the production of high tenacity viscose rayon fibers and filaments for use as reinforcement in molded rubber articles, such as tires, hose and the like, and in the production of high wet modulus viscose rayon fibers and filaments, it has been generally accepted practice to utilize certain modifying agents in the viscose, particularly polyalkylene glycols, ethoxylated fatty acids, fatty alcohols or fatty esters and ethoxylated higher aliphatic amines. In general, the use of the modifying agents has resulted in increases in the tenacity and abrasion resistance of the fibers and filaments.

The use of these modifying agents or additives has signficiantly increased the cost of the raw materials in the production of these fibers. In spinning, the additives are removed from the viscose by the spinning bath. No practical method has been devised for the recovery of these additives from the spinning bath and accordingly, there is a gradual buildup of the additives and the additive reaction products in the spinning bath. While the inorganic salts may be recovered from the baths, the modifying agents and their reaction products are present in effluent wash waters routed to waste treatment. This is highly undesirable because they add appreciably to the biological oxygen demand (BOD) which must be lowered to a level to meet standards established by Federal and state agencies. The discharge of this class of modifying agents and their reaction products thereby poses a significant environmental problem which can only be resolved by considerable expense in waste treatment facilities and operation of same.

The present invention provides a method of producing crimped high-wet modulus rayon fibers which are characterized generally by high strength, high wet modulus, a low water pickup and low shrinkage in fabric form but without the use of viscose modifiers.

The invention also provides viscose rayon fibers having high wet and conditioned moduli and high wet and conditioned strengths.

This invention further provides a more economical method of producing high wet modulus viscose rayon fibers and filaments. It also reduces BOD loading in waste treatment from the wash water of the process.

Other advantages of the invention will become apparent from the following description and claims.

In the drawings:

FIG. 1 is an enlarged (about 1000X) cross-sectional view of commercially available high wet modulus viscose rayon fibers of the type produced in accordance with the method disclosed in U.S. Pat. No. 3,277,226.

Figure 2:
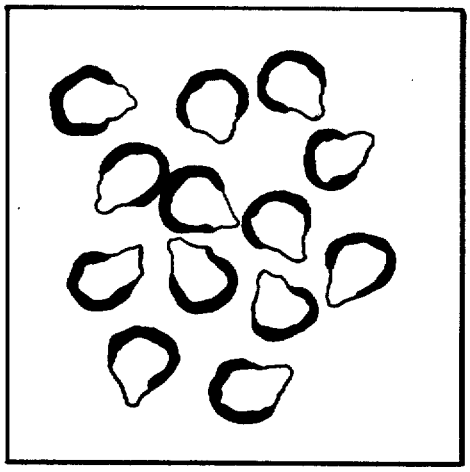

FIG. 2 is an enlarged (about 1000X) cross-sectional view of viscose rayon fibers formed in accordance with the method disclosed in U.S. Pat. No. 4,121,012.

Figure 3:
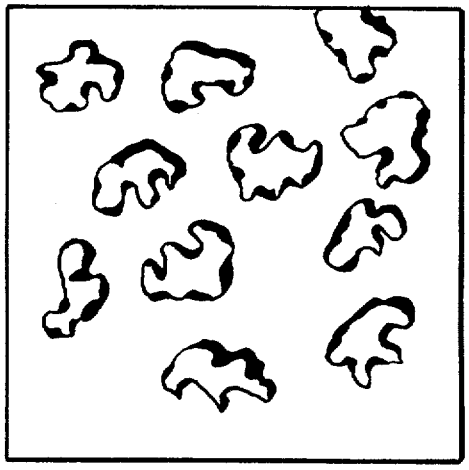

FIG. 3 is an enlarged (about 1000X) cross-sectional view of one embodiment of the viscose rayon fibers of this invention.

The present invention contemplates the production of crimped, high strength, high wet modulus viscose rayon fibers by utilizing modifier-free viscose and spinning baths having compositions within selected limits and spinning the viscose under a limited range of conditions. The method is applicable to the production of staple fibers in a wide range of deniers in accordance with conventional practice. In the production of rayon staple fibers, the viscose solution is converted into a plurality of filaments or tow which is cut to the desired fiber length to produce rayon staple. The term "fiber" will be used in the specification and it is to be understood that the term refers to staple fibers.

In the U.S. Pat. No. 4,121,012 to Bockno, there is disclosed a method of producing a crimped, high wet modulus fiber which has found commercial acceptance. A unique characteristic of the fiber is its high tensile strength in both wet and conditioned states.

The fibers of this invention may be used as a replacement for cotton in many textile constructions. They also may be blended with cotton. These fibers retain the usual desirable characteristics of rayon fibers, such as processability, dyeability, fabric finishing, and moisture regain. Both bright and delustered fibers can be made. Fabrics produced from these fibers are firm and cotton-like with respect to hand. This enhancement of fabric hand results from the unique combination of fiber cross-sectional shape and fiber modulus.

Fibers of this invention may be advantageously employed in blends with cotton, polyester, acrylic, or other synthetic fibers wherein the rayon content may be from 1 to 99%.

The wet modulus, expressed as grams per denier, as used herein is an average initial wet modulus which is defined as $$\text{wet modulus (g/d)} = \frac{\text{stress in g/d at 5\% elongation}}{0.05}$$

The wet modulus is a measure of the resistance of the wet fiber to stretching when subjected to tension.

Reported values of percentage elongation represent the amount of stretching in a fiber placed under tension as percentage of original fiber length at the break point.

Measurements of wet modulus and % elongation of single fibers may be made on an Instron Tensile Tester. The wet modulus of the viscose rayon fiber of the present invention varies between about 5.0 and 12 g/d, whereas low wet modulus rayon has a wet modulus of about 2.5 to 3 g/d. The % elongation of this fiber is generally within the range of from 14% to 27% when wet, and about 11% to 22% in the conditioned state.

The breaking tenacity (hereafter tenacity) of the fiber is generally within the range of from 1.5 to 2.7 grams per denier when wet, and about 2.8 to 4.0 grams per denier in the conditioned state.

As indicated, the high wet modulus fibers produced in accordance with U.S. Pat. No. 4,121,012 have highly desirable physical properties and characteristics. The necessity of utilizing the viscose modifiers, however, adds significantly to the cost of the raw materials, and creates significant additional costs needed to meet environmental water quality standards.

The fibers produced in accordance with that patent are characterized in having a substantially ovate section with from about 25 to 30% skin. On the other hand, fibers made in accordance with the present invention do not require the use of modifying agents, thus eliminating costs associated with use of such agents and the attendant pollution problem.

The present fibers have, in contrast, a highly desirable unsymmetrical, multilobular, skin-core type cross-section which provides a distinct improvement in fabric cover and a distinctly firmer (crisper) hand. The skin which is interrupted or discontinuous as illustrated in FIG. 3, constitutes from about 20% to about 35% of the cross-section. The fibers have from 10 to 30 crimps per inch (cpi).

The fibers and filaments of the present invention are obtained by proper adjustment of the interrelated parameters of the viscose process, namely the viscose composition, the method of prearation, the spinning bath composition, and the spinning conditions. In general, the viscose contains from 6% to 10% cellulose and from 4% to 9% caustic soda. The cellulose xanthate of the viscose is prepared by addition of from about 28% to 45% (preferably 30% to 32%) carbon disulfide, based upon the weight of the cellulose to the alkali cellulose.

Alkali cellulose is prepared by steeping commercially available high quality dissolving grade wood pulp in steeping presses or in continuous steeping equipment using aqueous solution of caustic soda for up to about one hour at ambient temperatures. The alkali cellulose is pressed to a press weight ratio of about 2.8 to 2.9:1. The pressed alkali cellulose is shredded and mercerized in the usual manner. It is then xanthated by the addition of the major proportion of carbon disulfide. The resulting xanthated alkali cellulose is dissolved in a caustic soda solution and the balance of the carbon disulfide added during the dissolving step. The step-wise addition of carbon disulfide commonly referred to as split xanthation is not essential, it is merely an alternate procedure for accomplishing the degree of xanthation desired.

In order to obtain optimum physical characteristics of the spun fibers, the viscose is ripened at a temperature between about 9° C. and 22° C. for up to about 30 hours (including the mixing and holding periods). Viscose formed as described will exhibit a salt test of from about 5.5 to 15 (preferably 6.0 to 8.5) and a spinning ball fall viscosity of 60 to 110 seconds. The total sulfur content will vary from about 2.1 to about 3.4% and the xanthate sulfur will vary from about 1.4 to about 3.4%.

The spinning bath should contain between 4% and 8% sulfuric acid, 0.5 to 3% zinc sulfate and from 16% to 22% sodium sulfate. During spinning, the temperature of the bath should be maintained between about 40° and 60° C., and the spinning speed, as measured at the tow oll, should be about 25 to 60 meters per minute which results in a calculated residence time of the tow in the spin bath of 0.66 to 7.5 seconds. From the spinning bath, the filaments, prior to washing, are passed through a second bath or stretch bath maintained at a temperature between about 80° C. and 98° C., preferably between 90° and 95° C., and the filaments are stretched from about 65% to about 120% (preferably 73–100%) during the travel through this bath. As is well known, the residence time of the tow in the spin bath can be controlled to obtain the desired stretch specification.

The stretch bath may be a hot water bath, a very dilute solution of sulfuric acid, or it may be a diluted spinning bath containing from 0.5 to 4.0% sulfuric acid, 0.1 to 2.0% zinc sulfate and 3 to 12% sodium sulfate. The fibers produced are subsequently subjected to the normal after-treatments such as washing, disulfurizing and bleaching by well known methods.

The following example is set forth illustrating the preparation of a representative crimped high wet modulus fiber formed in accordance with U.S. Pat. No. 4,121,012. The fiber produced therefrom are used as a control for the fibers prepared in accordance with the present invention.

EXAMPLE 1

Viscose was prepared by treatment of pulp sheets (98% alpha-cellulose, dissolving grade pulp,) with caustic soda, shredding the resulting alkali cellulose, xanthating the alkali cellulose and dissolving it in a caustic soda solution. The viscose so prepared contained 7.5% cellulose, 7.5% caustic soda and 34% carbon disulfide, based on the weight of the cellulose. Dimethylamine (1.75%) and 3.5% of polyoxyethylene glycol ether of phenol containing an average of 15 ethylene oxide units per mole of phenol, was incorporated in the viscose during the mixing operation. The viscose was then aged in the conventional manner at 18° C. for 14 hours.

The viscose at the time of spinning had a sodium chloride salt test of about 8.5, and a ball-fall viscosity of 70 to 80 seconds. Ball-fall viscosity is obtained by measuring the time in seconds required for a solid steel ball of ⅛ inch diameter to fall 8 inches in a column of viscose of ¾ inch diameter at 18° C.

The dimethylamine and phenol ether modifiers may be added at any stage in the preparation of the viscose to serve as a regeneration retardant.

The viscose was spun to form a 1.5 dpf, 12,000 filament tow by extrusion of the viscose through orifices about 0.0025 inch in diameter into a spinning bath containing 5% sulfuric acid, 17% sodium sulfate and 3% zinc sulfate, the spinning bath being maintained at a temperature of about 48° C. The filaments were withdrawn from the bath, passed over a first godet, through a hot seond bath, over a second godet, cut into staple, sluiced, aftertreated, and dried. The second bath was formed by diluting some of the spinning bath and contained about 2.5% sulfuric acid, about 1.5% zinc sulfate and about 8% sodium sulfate, and was maintained at a temperature of about 95° C. During passage of the filaments through the hot bath, they were stretched approximately 115%. The spinning speed was about 25 meters per minute. The wet yarn was cut into staple length fibers and dropped into a water sluice bath maintained at about 90° C. The staple fibers formed from 25 to 30 crimps per inch in the sluice bath. The crimped staple was then wet processed and dried.

The crimped fiber had a conditioned tenacity of about 4 grams per denier, a wet tenacity of about 2.7 grams per denier, a conditioned extensibility of about 14 percent, a wet extensibility of about 19 percent, an initial wet modulus of about 10.0, and was a substantially non-fibrillatable fibrous product. In cross-section, a representative filament had a smooth, broken skin which comprised about 25% of the cross-sectional area and encompassed about 65% of the periphery of the cross-section. The core was "broken-out" of the filament cross-section to provide an unbalanced shape.

EXAMPLE 2

Viscose was prepared as described in Example 1 with the exception that 1% dimethylamine and 2% of the polyoxyethylene glycol ether of phenol were incorporated into the viscose. At the time of spinning, the viscose had a sodium chloride salt test of 8.7 and a ball fall viscosity of 80–90 seconds. The total sulfur content was about 1.9% and the xanthate sulfur was about 1.5%. The viscose contained 7.5% cellulose, and 7.5% caustic soda. A total of 31% carbon disulfide based upon the weight of the cellulose and was added during xanthation and dissolving. The viscose was ripened at 18° C. to obtain at time of spinning a sodium chloride salt test of 8.0 to 9.0 and a ball fall viscosity of 75 seconds.

The viscose was spun to form a 12,000 filament tow by extrusion of the viscose through orifices 0.0025 in. in diameter. The spinning bath contained 5.6–6.0% sulfuric acid, 2.6–2.7% zinc sulfate and 17.3–17.9% sodium sulfate and was maintained at a temperature of 48° C. After an immersion of 21 inches (53 cm.), the filaments were withdrawn from the bath, passed over a first godet to a cascade bath, the bath temperature being about 95° C., over a second godet, cut into staple lengths, sluiced in hot water (95° C.), aftertreated and dried. The second bath was formed by diluting the spinning bath and contained about 2.5% sulfuric acid, about 1.5% zinc sulfate and about 8% sodium sulfate. During passage of the filaments through the hot bath, they were stretched approximately 105%. The spinning speed was 30 meters per minute. The fibers when sluiced in hot water formed 21–25 crimps per inch (cpi). The fibers had a linear density of 1.5 denier.

A representative filament of the present invention was formed in accordance with the folowing example.

EXAMPLE 3

Alkali cellulose was prepared by steeping a 98% alpha cellulose rayon grade dissolving pulp in 19% aqueous caustic soda, and pressing the steeped sheets to a press weight ratio of 2.8, to 1 followed by shredding and mercerizing the resulting alkali cellulose. Two-stage xanthation was effected by introducing about 85% of the carbon disulfide to the alkali cellulose in the xanthator and the balance of the carbon disulfide was added to the mixer during dissolving of the xanthate in the caustic soda solution. The viscose thus prepared contained 7.5% cellulose, and 7.5% caustic soda. A total of 31% carbon disulfide based upon the weight of the cellulose was added during xanthation and dissolving. The viscose was ripened at 10° C. for about 22 hours. At the time of spinning, the viscose had a sodium chloride salt test of 8.4 and a ball fall viscosity of 67 seconds. The total sulfur content was 1.96% and the xanthate sulfur was 1.49%.

The viscose was spun to form a 12,000 filament tow by extrusion through orifices about 0.0025 in. in diameter into a spinning bath containing 6.1% sulfuric acid, 2.6% zinc sulfate and 20.9% sodium sulfate, the bath being at a temperature of about 48° C. The filaments after 21 in. (53 cm.) immersion were withdrawn from the bath, wrapped over a godet, then passed through a hot second bath, wrapped over a second godet, and collected, The tow was then cut into staple lengths, sluiced in hot water (95° C.) during which fiber crimp developed, aftertreated and dried. The second bath was formed by diluting some of the spinning bath and contained about 2.5% sulfuric acid, about 1.5% zinc sulfate and about 8% sodium sulfate and was maintained at a temperature of 95° C.

During passage of the filaments through the hot bath, they were stretched approximately 99%. The spinning speed was 30 meters per minute. The filaments were cut into staple lengths and then sluiced in hot water forming 22–25 crimps per inch (cpi). The staple fibers were purified by washing, desulfurizing, finishing with a lubricant, and dried by usual methods. Linear density of the fiber was 1.5 denier. The average degree of polymerization (D.P.) of these cellulose fibers is 485 (range of 450–525).

Fibers of this embodiment preferably have a wet tenacity of between 2.0 and 2.3, a conditioned tenacity of between 3.6 and 3.8 grams per denier, a wet % elongation between 25 and 27%, a conditioned % elongation between 17 and 20%, an a wet modulus between 6.0 and 7.0.

The physical properties and characteristics of the filaments formed in accordance with Examples 2 and 3 are set forth in Table I.

The Wet Stiffness Factor as reported in Table I is the wet strength in grams per denier divided by the percent elongation in the wet state.

Using a viscose and spinning conditions as described in Example 3, fibers having nominal deniers of (a) 1.25, (b) 2.25, and (c) 3.00 were produced. Table II presents a listing of the tow filaments, jet orifice dimension, spinning bath composition and temperature used for the respective deniers. Table III presents the average physical properties of single fibers for parts (a), (b), and (c) of Example 3.

The foregoing Example 3 includes preferred viscose and spinning bath compositions and spinning conditions. The fibers formed as described are representative of fibers formed within the range set forth hereinbefore. This is demonstrated by the data in Table IV that summarizes compositions and conditions within the stated ranges. In all instances, the viscoses were prepared as described in Example 3 and had the compositions as set forth in Table IV. Each viscose was spun into the stated spinning bath to form a 12,000 filament tow at a spinning speed of 30 meters per minute. The fibers had a linear density of 1.5. The stretch baths had approximately the same composition and were at the same temperature as that used in Example 3. Example 3 is included in Table II for purposes of comparison.

Fabrics formed of fibers of the present invention exhibit significantly enhanced fabric hand, being firm and lacking the limpness of rayon fabrics. The hand is similar to that of cotton, but this is not true of the fabrics made from fibers of Examples 1 and 2. Fabric formed of fibers of the present invention also exhibit a distinct improvement in cover, as judged by this opacity which is visually readily observable and is further confirmed by light transmittance in a standarized test conducted on an Ozalid printer. These improvements in hand and cover are imparted by a combination of the multilobal cross-section, the fiber crimp, and the higher modulus. These physical attributes lead to a low packing factor in yarns prepared from the fibers.

The data presented in Table I illustrates that the filaments and fibers prepared in accordance with the present invention have attractive tensile properties, although not identical to filaments and fibers prepared in accordance with the methods disclosed in U.S. Pat. No. 3,277,226 and U.S. Pat. No. 4,121,012. The most distinctive difference between the products characterized in Table 1 is, that while the fibers prepared in accordance with the U.S. Pat. No. 3,277,226 (substantially circular in cross-section as shown by FIG. 1), and U.S. Pat. No. 4,121,012 (ovate in cross-section as shown in FIG. 2), the fibers of the present invention have a highly desirable, unsymmetrical, multilobular cross-section, as illustrated by FIG. 3.

The present invention may also be represented by a fiber formed in an alternate embodiment in accordance with the following example.

EXAMPLE 4

Alkali cellulose was prepared by steeping a 93% alpha cellulose rayon grade dissolving pulp in an 18% caustic soda solution and pressing to a press weight ratio of 2.8 to 1. By the usual techniques of steeping, a hemi-rich fraction of caustic soda was obtained and was reserved for use in viscose mixing.

The resulting alkali cellulose was shredded and mercerized at 18° C. for 18 hours. Xanthation was accomplished by one step addition of carbon disulfide. Virgin caustic soda mixed with hemi-rich reject soda and water was used to dissolve the xanthated crumb. The viscose thus prepared contained 9.2% cellulose and 6.0 caustic soda. It was prepared by the addition of 30% carbon disulfide, based upon the weight of the cellulose. The viscose was ripened at 18.5° C. for about 21 hours. At the time of spinning the viscose had a sodium chloride salt index of 6.0 and an average ball fall viscosity of 70 seconds. The total sulfur content was 2.3% and the xanthate sulfur was 1.4%.

The viscose was spun to form 12,000 filament tow by extrusion through orifices of 0.0025 in. in diameter into a spinning bath containing 5.7% sulfuric acid, 0.9% zinc sulfate, and 20% sodium sulfate, the bath being at a temperature of 60° C. The filaments were withdrawn from the bath, after a tow immersion of 24 inches, and wrapped on a godet and then passed through a hot regeneration bath, wrapped on a tow roll, collected and aftertreated. The hot regeneration bath was prepared by diluting some of the spinning bath and contained 2.5% sulfuric acid, about 0.4% zinc sulfate and about 8.0% sodium sulfate and maintained at a temperature of 93° C. During passage of the filaments through the hot bath, they were stretched 75%. The spinning speed was 60 meters per minute. After collecting the filaments, they were washed, desulfurized, finished with a lubricant, and dried by usual methods. These fibers had an average degree of polymerization D.P. range of 375–400.

Fibers of this embodiment have a wet tenacity between 1.7 and 1.8 grams per denier, a conditioned tenacity between 3.2 and 3.3 grams per denier, a wet % elongation between 15 and 18%, a conditioned % elongation between 12 and 14%, a wet modulus between 8.0 and 10.0, and 10 to 12 crimps per inch.

Another embodiment of the present invention was formed in accordance with the following example.

EXAMPLE 5

Alkali cellulose was prepared by steeping 96% alpha cellulose, rayon grade dissolving pulp, in an 18% caustic soda solution and pressing to a press weight ratio of 2.85 to 1. By the usual techniques of steeping, a hemi-rich fraction of caustic soda was obtained and was reserved for use in viscose mixing.

The resulting alkali cellulose was shreded and mercerized at 18° C. for 20 hours. Xanthation was accomplished by one step addition of carbon disulfide. Virgin caustic soda mixed with hemi-rich reject soda and water was used to dissolve the xanthated crumb. After final mixing, the viscose had a composition of 7.5% cellulose, 7.5% caustic soda. It was prepared by the addition of 32.5% carbon disulfide (based on weight of cellulose).

The viscose was ripened at 23° C. for about 20 hours. At the time of spinning, the viscose had a sodium chloride salt test of 8.2 and a ball fall of 76 seconds. The total sulfur content was 1.99% and the xanthate sulfur was 1.50%.

The viscose was spun to form a 28,500 filament tow by extrusion through orifices having 0.0020 diameter in a spinning bath containing 5.9% sulfuric acid, 2.4% zinc sulfate, and 18.2% sodium sulfate, the bath being at a temperature of about 47° C. The filaments after 23 inches (58 cm) immersion were withdrawn from the bath, wrapped over a godet, then passed through a hot regeneration bath and finally wrapped on a tow roll. The regeneration bath was formed by diluting some of the spin bath and contained 2.2% sulfuric acid, 0.85% zinc sulfate, and 6.6% sodium sulfate and was maintained at a temperature of 90°–92° C. The tow filaments were stretched 92% between the godet and the tow roll with the tow roll delivering stretched tow at 29.3 meters per minute. The tow was then fed to a cutter to produce staple fibers which were washed, desulfurized, and finished with a lubricant. The staple was then dried by commerical rayon manufacturing methods.

The physical properties and characteristics of the filaments formed in accordance with Examples 4 and 5 are also set forth in Table I.

The present invention provides regenerated cellulose fibers having a wet tenacity of at least about 1.5 grams per denier, in general varying up to about 2.7 grams per denier. In the conditioned state, that is, after the fibers have been initially dried and then held in an atmosphere having a temperature of 75° F. (24° C.) and a relative humidity of 58% for twenty-four hours, the fibers have a tenacity of between about 2.8 and 4.0 grams per denier. The fibers have a wet modulus of between 5.0 and 12, a wet % elongation of between about 14% and 26% and a conditioned % elongation of between about 11% and 22%. The fibers are further characterized in having a skin-core structure, wherein the core is surrounded by a discontinuous, broken skin and being multilobular in cross-section.

The method of the present invention includes the use of a modifier-free viscose containing from 6% to 10% cellulose, from 4% to 9% caustic soda and from 28% to 45% carbon disulfide, based on the weight of the cellulose, ripened at a temperature of from 9° C. to 22° C. for up to about 30 hours and having a salt test of from about 5.5 to 15, such as, for example, 7.5% cellulose, ripened at 18° C. for 22 hours and having a salt test of 8.0 to 8.5. The viscose is spun at a spinning speed of 20 to 60 meters per minute into a spinning bath containing 4% to 8% sulfuric acid, 0.5% to 3.0% zinc sulfate and 17% to 22% sodium sulfate maintained at a temperature of between 40° C. and 65° C., such as, for example, 6.2% sulfuric acid, 2.5% zinc sulfate and 17.5% sodium sulfate maintained at about 48° C. The filaments are stretched from about 65% to 120% in a hot, dilute acid bath, 88° C. to 95° C., consisting of from 1% to 4% sulfuric acid, from 0.3% to 1.2 zinc sulfate and from 3 to 12% sodium sulfate, e.g. 3.4% $H_2SO_4$, 1.75% $ZnSO_4$ and 5.4% $Na_2SO_4$ at a temperature of 90° C.

It is apparent from the foregoing disclosure that the present method results in a reduction in the fiber manufacturing cost, by eliminating the need for viscose modifiers typically used for producing HWM fibers. The elimination of these viscose modifiers reduces costs with respect to the cost of the modifiers and of reducing BOC loading of plant effluent waste waters. The economic advantages are achieved in addition to obtaining the essential and desirable fibers properties, and the consequent desirable improvement in fabrics achievable with the fibers of this invention.

A crimp measurement for staple fibers is made by removing small bundles of fibers (approximately 10 fibers) from where the crimp of the fibers appears to be in phase. The fiber are laid on a black felt in a linear relationship. The number of crimps are counted over a one inch linear dimension without extending the fibers in the linear dimension, wherein a crimped is designated as a change in direction of the fibers.

TABLE I

| | Example 2 (FIG. 2) | Example 3 (FIG. 3) | Example 4 | Example 5 |
|---|---|---|---|---|
| Strength, gm./denier: | | | | |
| Wet | 2.61 | 2.22 | 1.75 | 2.08 |
| Conditioned | 4.28 | 3.73 | 3.22 | 3.65 |
| Elongation, percent: | | | | |
| Wet | 19.6 | 26 | 17.9 | 20.9 |
| Conditioned | 14.6 | 19.4 | 13.8 | 26.7 |
| Wet Modulus at 5% Elongation | 9.9 | 6.6 | 8.3 | 7.5 |
| Wet Stiffness Factor | 13.3 | 8.6 | — | — |
| Cross-section | Ovate | Multi-Lobular | Semi-Symmetrical Multilobe | Unsymmetrical Multilobe |
| Skin, percent | 25–30 | 20–35 | 15–20 | 20–35 |
| Water Retention, percent | 75–80 | 80–85 | — | — |
| Solubility, percent in 5% NaOH | 8–10 | 10–12 | — | — |
| Crimps per inch | 20–22 | 22–25 | 11–12 | 20–23 |
| Breaking energy (conditioned) (gram-centimeters per denier per centimeter) | 0.34 | 0.31–0.41 | — | — |

TABLE II

| PARTS (a), (b), AND (c) of EXAMPLE 3 | | | | | | | |
|---|---|---|---|---|---|---|---|
| | | | | Spinning Bath Composition | | | |
| Part | Linear Density | No. of Filaments in Tow | Jet Orifice Diameter In. | % $H_2SO_4$ | $ZnSO_4$ | $Na_2SO_4$ | Temp. °C. |
| (a) | 1.25 | 12,000 | .0025 | 6.1 | 2.6 | 20.9 | 48° |
| (b) | 2.25 | 12,000 | .0025 | 6.5 | 2.6 | 21.0 | 48° |
| (c) | 3.00 | 17,600 | .0025 | 7.2 | 2.6 | 21.0 | 48° |

TABLE III

| Average Physical Properties of Single Fibers Example 3, Parts (a), (b), and (c) | | | |
|---|---|---|---|
| | Part (a) | Part (b) | Part (c) |
| Denier | 1.26 | 2.24 | 3.02 |
| Strength (Tenacity) g/d | | | |
| Wet | 2.15 | 2.10 | 2.03 |
| Conditioned | 3.81 | 3.74 | 3.67 |
| Elongation, percent | | | |
| Wet | 25.3 | 26.2 | 26.7 |
| Conditioned | 19.6 | 20.1 | 20.3 |
| Wet Modulus at 5 percent Elongation, g/d | 6.3 | 6.0 | 5.9 |
| Crimps/Inch | 24 | 21 | 19 |

TABLE IV

| | Viscose 7.5% Cellulose 7.5% NaOH | | | | | | | | Fiber Properties | | | | | | | |
|---|---|---|---|---|---|---|---|---|---|---|---|---|---|---|---|---|
| | $CS_2$ % (boc) | NaCl Salt Index | Spin Ball Fall Sec. | Spinning Bath $H_2SO_4$ % | $ZnSO_4$ % | $Na_2SO_4$ % | Temp. °C. | Spin. Stretch % | Spinning Speed m/min. | $T_c$ g/d | $E_c$ % | $T_w$ g/d | E % | $M_w$ | Crimp CPI | Breaking Energy $BE_c$ |
| Ex. 3 | 31 | 8.4 | 67 | 6.1 | 2.6 | 20.9 | 48 | 99 | 30 | 3.73 | 19.4 | 2.22 | 26 | 6.6 | 22–25 | — |
| A-1 | 40 | 15.2 | 115 | 5.8 | 2.9 | 17.1 | 55 | 109 | 30 | 2.96 | 18.1 | 1.91 | 23.8 | 5.0 | 20–22 | 0.30 |
| A-2 | 40 | 15.1 | 115 | 5.6 | 2.8 | 17.0 | 55 | 109 | 30 | 2.99 | 17.3 | 1.83 | 19.8 | 5.3 | 20–22 | 0.29 |
| A-3 | 40 | 15.1 | 115 | 5.7 | 2.5 | 17.7 | 55 | 109 | 30 | 3.50 | 18.5 | 2.08 | 23.9 | 5.3 | 20–22 | 0.35 |
| A-4 | 40 | 15.3 | 92 | 5.9 | 2.0 | 17.4 | 52 | 102 | 30 | 2.85 | 16.5 | 1.86 | 19.9 | 5.5 | 15–18 | 0.27 |
| A-5 | 31 | 9.0 | 75 | 6.4 | 2.7 | 17.4 | 48 | 102 | 30 | 3.92 | 16.2 | 2.32 | 20.1 | 8.4 | 20–21 | 0.34 |
| A-6 | 31 | 8.9 | 58 | 7.6 | 2.7 | 17.1 | 48 | 115 | 30 | 3.97 | 14.4 | 2.68 | 23.3 | 9.5 | 20 | 0.31 |
| A-7 | 31 | 8.5 | 84 | 5.9 | 2.3 | 21.1 | 55 | 102 | 30 | 3.83 | 18.1 | 2.32 | 20.8 | 7.5 | 20–21 | 0.39 |
| A-8 | 31.5 | 6.6 | 78 | 6.9 | 2.7 | 17.9 | 48 | 110 | 30 | 3.47 | 15.0 | 1.98 | 19.4 | 8.7 | 20–21 | 0.29 |

TABLE IV-continued

| | Viscose 7.5% Cellulose 7.5% NaOH | | | | | | | | | | | | | | | |
|---|---|---|---|---|---|---|---|---|---|---|---|---|---|---|---|---|
| | | | | Spinning Bath | | | | | Fiber Properties | | | | | | | |
| | $CS_2$ % (boc) | NaCl Salt Index | Spin Ball Fall Sec. | $H_2SO_4$ % | $ZnSO_4$ % | $Na_2SO_4$ % | Temp. °C. | Spin. Stretch % | Spinning Speed m/min. | $T_c$ g/d | $E_c$ % | $T_w$ g/d | E % | $M_w$ | Crimp CPI | Breaking Energy $BE_c$ |
| A-9 | 31.5 | 6.6 | 78 | 6.9 | 2.7 | 17.6 | 42 | 102 | 30 | 3.80 | 16.2 | 2.27 | 20.3 | 7.4 | 20 | 0.33 |

What is claimed is:

1. A regenerated cellulose fiber having a wet tenacity about 1.5 to 2.7 grams per denier, a conditioned tenacity of about 2.8 to 4.0 grams per denier, a wet % elongation between about 14% and 27%, a conditioned % elongation between 11% and 22%, and having a wet modulus between 5.0 and 12.0 and being further characterized in having a multilobular, skin core cross-section wherein the core is surrounded by a discontinuous broken skin, and a crimp level of 10 to 30 crimps per inch and having been formed by the method comprising (a) preparing a modifier-free viscose containing from about 6% to 10% cellulose, from about 4% to 9% caustic soda, and from 28% to 45% carbon disulfide based upon the weight of cellulose, ripening the viscose to a sodium chloride salt index of 5.5 to 15 and a spinning ball fall of 60 to 110 seconds, (b) extruding the ripened viscose into an aqueous spinning bath containing from about 4% to 8% sulfuric acid, from about 0.5% to 3.0% zinc sulfate and from about 16% to 22% sodium sulfate, maintained at a temperature between 40 and 60 degrees centigrade, (c) withdrawing the filaments through an aqueous stretch bath maintained at a temperature between 80 and 98 degrees centigrade, [and]

(d) controlling residence time in the spin bath so as to allow stretching the filaments in the stretch bath from about 65% to 120%.

*(e) cutting the stretched filaments into staple length fibers, and*

*(f) relaxing the cut fibers in water having a temperature between about 75 and 100 degrees centigrade.*

2. The fiber as defined in claim 1 wherein the viscose at the time of extrusion was ripened at a temperature between 9 and 22 degrees centigrade for up to 30 hours, and said stretch bath contains from 1.0% to 4% sulfuric acid, from 0.3% to 1.2% zinc sulfate and from 3% to 12% sodium sulfate.

3. The fiber as defined in claim 1 wherein the viscose contains about 7.5% cellulose, about 7.5% caustic soda, and about 31% carbon disulfide based upon the weight of the cellulose, and the viscose at the time of extrusion has a salt test of between 8.0 and 8.5.

4. The fiber as defined in claim 1 wherein the spinning bath contains about 6.1% sulfuric acid, about 2.6% zinc sulfate and about 20.9% sodium sulfate.

5. The fiber as defined in claim 1 wherein (a) the viscose contains about 7.5% cellulose, about 7.5% caustic soda and about 30% to 32% carbon disulfide and has a salt test of between 6.0 and 8.5, a spinning ball fall of between 65 and 80 seconds;

(b) the spinning bath contains between 5.8% and 6.5% sulfuric acid, between 2.0% and 3.0% zinc sulfate, between 16% and 22% sodium sulfate and is maintained at a temperature between 40 and 55 degrees centigrade; and (c) the stretch bath contains between 1.0% and 4.0% sulfuric acid, between 0.3% and 1.2% zinc sulfate, and between 3 and 12% sodium sulfate and is maintained between 85 and 95 degrees centigrade and the filaments are stretched in the bath about 90 to 120%.

6. The fiber as defined in claim 1 wherein (a) the viscose contains about 7.5% cellulose, about 7.5% caustic soda and about 31% carbon disulfide, and the viscose at the time of extrusion has a salt test of 8.0 to 8.5 and a ball fall viscosity of 75 seconds;

(b) the spinning bath contains about 6.1% sulfuric acid, about 2.5% zinc sulfate and about 20.9% sodium sulfate, and is maintained at a temperature of about 48 degrees centigrade;

(c) the stretch bath contains about 2.5% sulfuric acid, about 0.85% zinc sulfate and about 6.6% sodium sulfate and is maintained at about 90 degrees centigrade, and the filaments are stretched in the stretch bath about 95% to 100%.

7. The fiber as defined in claim 1 having a wet tenacity between 2.0 and 2.3 grams per denier, a conditioned tenacity between 3.6 and 3.8 grams per denier, a wet % elongation between 25 and 27%, a conditioned % elongation between 17 and 20%, a wet modulus between 6.0 and 7.0, 22 to 25 crimps per inch, and an average degree of polymerization of 450–525.

8. The fiber as defined in claim 1 wherein the viscose contains about 9.2% cellulose, about 6.0% caustic soda and about 30% carbon disulfide, based upon the weight of the cellulose, and the viscose at the time of extrusion has a sodium chloride salt test of between 5.7 and 6.3.

9. The fiber as defined in claim 1 wherein the spinning bath contains about 5.7% sulfuric acid, about 0.9% zinc sulfate and about 18% sodium sulfate.

10. The fiber as defined in claim 1 wherein (a) the viscose contains about 9.2% cellulose, about 6.0% caustic soda and about 29% to 31% carbon disulfide and has a salt test of between 5.7 and 6.3, and a spinning ball fall of between 65 and 70 seconds;

(b) the spinning bath contains between 5.3% and 6.0% sulfuric acid, between 0.9% and 2% of zinc sulfate, between 17% and 22% sodium sulfate and is maintained at a temperature between 50 and 60 degrees centigrade; and (c) the stretch bath contains between 1.0% and 4.0% sulfuric acid and is maintained between 90 and 95 degrees centigrade and the filaments are stretched in the bath about 65 to 85%.

11. The fiber as defined in claim 1 wherein (a) the viscose contains about 9.2% cellulose, about 6.0% caustic soda and about 30% carbon disulfide, and the viscose at the time of extrusion has a salt test of 5.7 to 6.3 and a ball fall viscosity of 70 seconds;

(b) the spinning bath contains about 5.7% sulfuric acid, about 0.9% zinc sulfate and about 20% sodium sulfate, and is maintained at a temperature of about 60 degrees centigrade; and (c) the stretch bath contains about 2.5% sulfuric acid, about 0.4% zinc sulfate and about 8.0% sodium sulfate and is maintained at about 93 degrees centigrade, and the filaments are stretched in the stretch bath about 70% to 75%.

12. The fiber as defined in claim 1 having a wet tenacity between 1.7 and 1.8 grams per denier, a conditioned tenacity between 3.2 and 3.3 grams per denier, a wet % elongation between 15 and 18%, a conditioned % elongation between 12 and 14%, a wet modulus between 8.0 and 10.0, 10 to 12 crimps per inch, and an average degree of polymerization of 375–400.

13. A fabric formed of regenerated cellulose fibers as defined in claim 1.

14. A fabric formed of cotton and from 1% to 99% by weight of the fabric of regenerated cellulose fibers as defined in claim 1.

15. A fabric formed of polyester and from 1% to 99% by weight of the fabric of regenerated cellulose fibers as defined in claim 1.

16. The fiber as defined in claim [11] *5* having a wet tenacity between 2.0 and 2.2 grams per denier, a conditioned tenacity between 3.6 and 3.8 grams per denier, a wet % elongation between 24% and 27%, a conditioned % elongation between 17 and 20% and a wet modulus between 6.0 and 7.0, 20–24 crimps per inch, and a degree of polymerization of 460.

17. The fiber as defined in claim 11 having a wet tenacity between 1.7 and 1.8 grams per denier, a conditioned tenacity between 3.2 and 3.3 grams per denier, a wet % elongation between 15 and 18%, a conditioned % elongation between 12 and 14% and a wet modulus between 8.0 and 10.0, 10–12 crimps per inch, and an average degree of polymerization of 375–400.

18. A fabric formed of regenerated cellulose fibers as defined in claim 11.

19. A fabric formed of cotton and from 1% to 99% by weight of the fabric of regenerated cellulose fibers as defined in claim 11.

20. A fabric formed of polyester fibers and from 1% to 99% by weight of the fabric of regenerated cellulose fibers as defined in claim 11.

21. A fabric formed of arcylic fiber and from 1 to 99% by weight of the fabric of regenerated cellulose fibers as defined in claim 11.

22. The fiber as defined in claim 1 wherein the modifier-free viscose is prepared from a dissolving grade pulp ranging from 93 to 99% alpha cellulose content.

* * * * *